United States Patent
Reich et al.

(10) Patent No.: US 9,269,508 B2
(45) Date of Patent: Feb. 23, 2016

(54) TAP SWITCH

(71) Applicants: Alexander Reich, Mintraching (DE); Volker Karrer, Regensburg (DE)

(72) Inventors: Alexander Reich, Mintraching (DE); Volker Karrer, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 0 days.

(21) Appl. No.: 14/375,860

(22) PCT Filed: Jan. 15, 2013

(86) PCT No.: PCT/EP2013/050614
§ 371 (c)(1),
(2) Date: Jul. 31, 2014

(87) PCT Pub. No.: WO2013/131664
PCT Pub. Date: Sep. 12, 2013

(65) Prior Publication Data
US 2015/0014130 A1 Jan. 15, 2015

(30) Foreign Application Priority Data

Mar. 8, 2012 (DE) .......................... 10 2012 101 951

(51) Int. Cl.
*H01H 9/00* (2006.01)
*H01F 29/02* (2006.01)
(Continued)

(52) U.S. Cl.
CPC ............ *H01H 9/0011* (2013.01); *H01F 29/02* (2013.01); *H01H 9/0027* (2013.01); *H02M 1/32* (2013.01); *H02M 1/34* (2013.01); *H02M 5/257* (2013.01);
(Continued)

(58) Field of Classification Search
CPC ........... G05F 1/20; G05F 1/153; G05F 1/147; H01F 29/04; H01F 29/02; H02H 7/055; H02H 3/023; H02H 7/04; H02M 5/12; H01H 9/0005; H02J 3/1878
See application file for complete search history.

(56) References Cited

U.S. PATENT DOCUMENTS 3,502,961 A 3/1970 Matzl
3,978,395 A 8/1976 Legnaioli
(Continued)

FOREIGN PATENT DOCUMENTS

DE 1800618 A 5/1970
DE 2248166 A 4/1973
(Continued)

OTHER PUBLICATIONS

J.Faiz and B.Siahkolah, Optimal Configurations for Taps of Windings and Power Electronic Switches in Electronic Tap-Changer, IEEProceedings online No. 20020656,IEE Proc-Gener.Transm. Distrib.,vol. 149, No. 5,Sep. 2002.
(Continued)

*Primary Examiner* — Adolf Berhane
*Assistant Examiner* — Henry Lee, III
(74) *Attorney, Agent, or Firm* — Andrew Wilford

(57) ABSTRACT

The invention relates to a tap changer for voltage regulation with semiconductor switching components on a regulating transformer having a regulating winding. The tap changer is of a modular design and each module comprises, respectively, one partial winding of the regulating winding that is connectable or disconnectable by means of semiconductor switching components. Varistors and capacitors are additionally integrated for protecting the semiconductor switching components against high voltages.

6 Claims, 1 Drawing Sheet

(51) Int. Cl.
*H02P 13/06* (2006.01)
*H02M 1/34* (2007.01)
*H02M 5/257* (2006.01)
*H02M 1/32* (2007.01)

(52) U.S. Cl.
CPC ......... *H02P 13/06* (2013.01); *H02M 2001/348* (2013.01)

(56) References Cited

U.S. PATENT DOCUMENTS

| | | |
|---|---|---|
| 4,723,187 A | 2/1988 | Howell |
| 5,604,423 A | 2/1997 | Degeneff |
| 5,604,424 A * | 2/1997 | Shuttleworth ................ 323/258 |
| 5,990,667 A | 11/1999 | Degeneff |
| 2012/0306471 A1 | 12/2012 | Green |

FOREIGN PATENT DOCUMENTS

| | | |
|---|---|---|
| DE | 2331388 A | 2/1975 |
| DE | 19747712 A | 5/1999 |
| DE | 19848428 A | 5/2000 |
| GB | 1216691 A | 12/1970 |
| GB | 2307567 A | 5/1997 |
| WO | 0135432 A | 5/2001 |
| WO | 2007135209 A | 11/2007 |

OTHER PUBLICATIONS

Osman Demirci, David A. Torrey, Robert C. Degeneff, Friedrich K. Schaeffer, Robert H. Frazer, A New Approach to Solid-State on Load Tap Changing Transformers, IEEE Transactions on Power Delivery, vol. 13, No. 3, Jul. 1998.

P. Bauer, S.W.H. de Haan, G.C. Paap, Electronic Tap Changer for 10 KV Distribution Transformer, Delft University of Technology, The Netherlands.

* cited by examiner

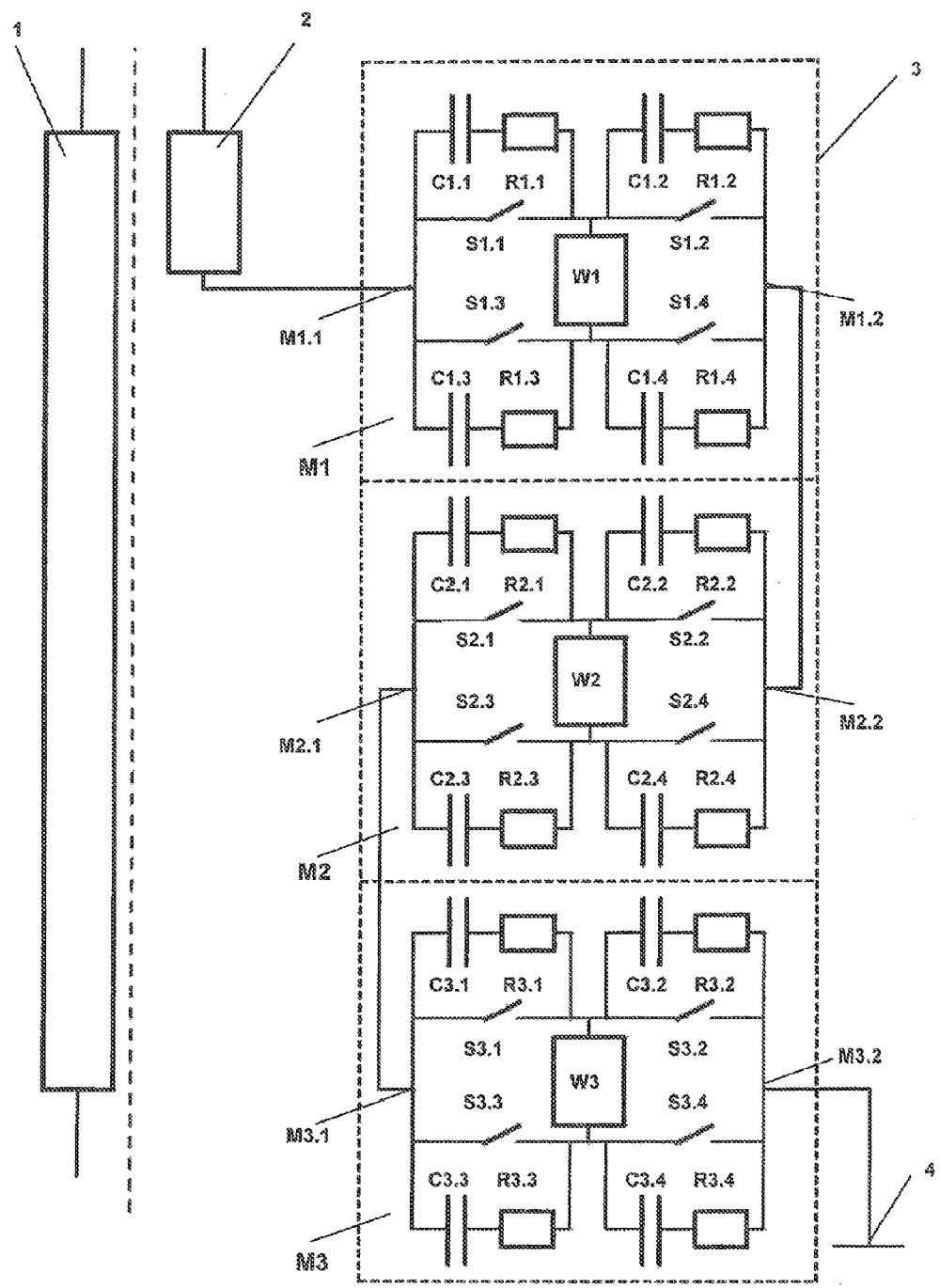

TAP SWITCH

CROSS REFERENCE TO RELATED APPLICATIONS

This application is the US-national stage of PCT application PCT/EP2013/050614 filed 15 Jan. 2013 and claiming the priority of German patent application 102012101951.7 itself filed 8 Mar. 2012.

FIELD OF THE INVENTION

The invention relates to a tap changer for voltage regulation with semiconductor switches.

BACKGROUND OF THE INVENTION

A regulatable transformer with semiconductor switches is already described in DE 22 48 166. The secondary winding there comprises a specific number of regulating winding parts, a certain number of which are assembled in a series-connected group of windings, wherein each winding group has two or three regulating winding parts that are connected in parallel. In that arrangement, each winding part is provided with a contactless switch. This reference also describes another variant wherein the secondary winding of the transformer comprises a group of series-connected regulating winding parts, with each winding part comprising four contactless switches. The arrangement is equipped such that terminal voltage polarity of the regulating winding part is reversible and the entire regulating winding part is optionally bypassable as well.

A further apparatus for stepped switching of the secondary voltage of a transformer is known from DE 25 08 013 [U.S. Pat. No. 3,978,395]. The secondary winding is grouped in partial windings in that case too, and semiconductor switches can also be provided.

DE 197 47 712 describes a similar type of tap changer arranged on a tapped transformer that is constructed as an autotransformer. Individual winding parts that are connectable individually and independently from each other, are also provided here. Besides fixed taps of the regulating winding, this arrangement also comprises separate switchable or connectable winding parts.

Known from WO 1995/027931 [U.S. Pat. No. 5,604,423] are various embodiments of another tap changer for uninterrupted load transfer, wherein thyristors also serve as switches. Different winding parts of a tap winding can then be connected or disconnected as part of the secondary winding of the respective tapped transformer by anti-parallel connected thyristor pairs. The specification further proposes a method termed "discrete circle modulation" for realizing as fine-stepped a voltage regulation as possible with a limited number of winding taps present, in which method the thyristors are activated in such a manner that intermediate values of the secondary voltage result.

A modularly constructed semiconductor tap changer system is known from the publication "A new approach to solid-state on load tap changing transformers" (Osman, Demirci; David, A., Torrey; Rober, C., Degeneff; IEEE Transactions on Power Delivery, Vol. 13, Issue: 3, July 1998). There, the regulating winding is connected in series with multiple modules. Each of the modules comprises semiconductor switches and partial windings with different numbers of turns. Targeted actuation of the semiconductor switches allows the partial windings to be connected with or disconnected from the regulating winding. By the different numbers of turns it is even possible to switch partial windings against each other and against the main winding.

In the solutions known from the prior art, semiconductor switches de facto take over the function of the mechanical selector arm in classic mechanical tap changers. Individual winding taps of the regulating windings can specifically be connected or disconnected by the semiconductor switches. It is also possible to subdivide the regulating winding into partial windings that are separately connectable.

These tap changers must comply with the requirements of the different IEC standards 60214-1 in combination with IEC 60060. Among others, a separate source AC withstand voltage test and a lightning impulse voltage test have to be performed. In the separate source AC withstand voltage test, a single-phase alternating voltage of a frequency of 50 or 60 Hz is applied for 60 seconds. According to the approved medium operating voltage, these values can range from 20 kV to 325 kV. The lightning impulse voltage test must be performed at the standard 1.2/50 µs. The alternating voltage can rise up to a level of 1.8 MV in the process. Since these alternating voltages apply immediately at the tap changer, in particular at the semiconductor switches, and since it is either not possible or only possible with great effort to design the semiconductor switches for such high alternating voltages, damages to the semiconductor switches are likely to occur.

OBJECT OF THE INVENTION

It is therefore the object of the invention to provide a tap changer with semiconductor switches in which the semiconductor components are protected from high alternating voltages resulting from the tests performed in compliance with the standards.

SUMMARY OF THE INVENTION

This object is attained by a tap changer that connects in parallel with each semiconductor switch a voltage-dependent resistor that is series-connected with a capacitor.

BRIEF DESCRIPTION OF THE DRAWING

The invention will be explained exemplarily in more detail in the following by the sole FIGURE of the drawing.

SPECIFIC DESCRIPTION OF THE INVENTION

The FIGURE shows a transformer to be regulated comprising a low voltage winding 1 and a high voltage winding regulating winding (high voltage winding) 2, here including three separate partial windings W1, W2, and W3 each having two opposite ends. A tap changer 3 according to the invention is connected to the regulating winding 2. The dotted line here shows that the tap changer 3 comprises three individual modules M1, M2, M3. The number of modules is, however, selectable as required. The first module M1 comprises the first partial winding W1 and on its two ends respective first and second respective bypass paths that each comprise a respective series connection of two semiconductor switches, for example first and second switches S1.1 and S1.2 or S1.3 and S1.4. Between each of the two series-connected switches is a center tap M1.1 and M1.2. In parallel with the semiconductor switches S1.1-S1.4 is a respective capacitor C1.1-C1.4 in series with a respective voltage-dependent resistor R1.1-R1.4.

The individual semiconductor switches are illustrated only schematically as simple switches. In practice, they comprise parallel-connected thyristors, IGBTs or other semiconductor switches. They can also each comprise a series connection or a parallel connection of a plurality of such individual semiconductor switches. The voltage-dependent resistors are so-called varistors or transient-voltage-suppression diodes.

The center tap M1.1 of the first module M1 is electrically connected with one end of the high voltage winding 2. The modules M1 and M2 are electrically connected via the center taps M1.2 and M2.2. This second module M2 is identically constructed; it also comprises a partial winding W2, the two series connections that are each of two semiconductor switches S2.1 and S2.2 or S2.3 and S2.4, and in parallel therewith capacitors C2.1-C2.4 and resistors R2.1-R2.4 that are connected in series. Again, center taps M2.1 and M2.2 are provided between the respective series connections. The connection of the one center tap M2.2 with the first module M1 has already been explained above; the second center tap M2.1 is connected with a center tap M3.1 of a third module M3 of the same type. This module also contains semiconductor switches S3.1-S3.4 with the center taps M3.1 and M3.2 arranged between them, as well as capacitors C3.1-C3.4, resistors R3.1-R3.4 and a partial winding W3. The third module is connected via the center tap M3.2 with a load (star point) 4.

The three described modules M1, M2, M3 can differ in the dimensions of the respective partial windings W1, W2, W3.

Targeted actuation of the semiconductor switches S1.1-S3.4 of the individual modules M1-M3 allows connecting individual partial windings W1-W3 in the same sense or in the opposite sense. If the partial windings have different dimensions, it is even possible to switch the partial windings against each other.

Performing the tests according to the IEC standard involves the application of very high voltages to the semiconductor switches S1.1-S3.4. In order to protect them during the lightning impulse voltage test and during the separate source AC withstand is voltage test, a voltage-dependent resistor R1.1-R3.4 (for instance a varistor or a gas-filled surge protector etc.) is also connected in parallel.

The voltage-dependent resistor R1.1-R3.4 is designed to precisely not conduct in the instance of the separate source AC withstand voltage test, or, in a further embodiment, to conduct such a low current that the resulting power dissipation for the time period mentioned will not lead to destruction of the components. During the lightning impulse voltage test, the voltage-dependent resistor R1.1-R3.4 becomes conductive and limits the voltage rise across at the respective semiconductor switch S1.1-S3.4. It is therefore necessary to design the semiconductor switch to withstand the applied voltage without being destroyed.

Compared with the separate source AC withstand voltage test, the voltage pulse rise of the lightning impulse voltage test is many times more rapid, so it also exhibits higher frequencies (greater than 60 Hz) than the range of the separate source AC withstand voltage test (maximally 60 Hz). For this reason, the voltage-dependent resistor R1.1-R3.4 is linked capacitively. This is realized by the series connection with the respective capacitor CV1.1-C3.4. Such a link creates a high pass. During the low frequency separate source AC withstand voltage test, the stress is kept away by the voltage-dependent resistor R1.1-R3.4.

A particularly advantageous feature of this arrangement lies in the fact that the voltage-dependent resistors R1.1-R3.4 (varistors) in connection with the capacitors C1.1-C3.4 thus only have to be designed to the requirements of the lightning impulse is voltage test. These requirements are significantly lower than those of the separate source AC withstand voltage test because less energy is contained that is reflected in the costs and the required installation space. A further positive effect is that the semiconductor switches Sn.n can be designed to smaller dimensions. This also leads to cost benefits.

The invention claimed is:

1. In combination with a load and with a regulating transformer having a regulating winding including a partial first winding having opposite first and second ends, a tap changer comprising:
   respective first and third primary semiconductor switches connected between the first and second ends of the partial first winding and a first center tap connected to the regulating winding;
   respective second and fourth primary semiconductor switches connected between the first and second ends of the partial first winding and a second centertap connected at least indirectly to the load, whereby the first and second primary switches form a first bypass path between the regulating winding and the second centertap and the third and fourth primary switches form a second bypass path between the regulating winding and the second centertap;
   respective first through fourth primary resistors; and
   respective first through fourth primary capacitors connected in series with the respective first through fourth primary resistors and forming therewith first through fourth primary bypass paths across the respective first through fourth primary switches.

2. The tap changer defined in claim 1, wherein the regulating winding includes a second partial winding having opposite first and second ends, the tap changer further comprising:
   respective first and third secondary semiconductor switches connected between the first and second ends of the second partial winding and a third center tap connected at a third centertap at least indirectly to the load;
   respective second and fourth secondary semiconductor switches connected between the first and second ends of the second partial winding and the second centertap, whereby the first and second secondary switches form a first secondary bypass path between the second centertap and the load and the third and fourth secondary switches form a second secondary bypass path between the second centertap and the load;
   respective first through fourth secondary resistors; and
   respective first through fourth secondary capacitors connected in series with the respective first through fourth secondary resistors and forming therewith first through fourth secondary bypass paths connected across the respective first through fourth secondary switches.

3. The tap changer defined in claim 2, wherein the regulating winding includes a third partial winding having opposite first and second ends, the tap changer further comprising:
   respective first and third semiconductor tertiary switches connected between the first and second ends of the second partial winding and a third center tap connected to the load;
   respective second and fourth semiconductor tertiary switches connected between the first and second ends of the partial winding and the second centertap, whereby the first and second tertiary switches form a first bypass path between the third centertap and the load and the third and fourth tertiary switches form a second bypass path between the third centertap and the load;
   respective first through fourth tertiary resistors; and
   respective first through fourth tertiary capacitors connected in series with the respective first through fourth tertiary resistors and forming therewith first through fourth tertiary bypass paths connected across the respective first through fourth tertiary switches.

4. The tap changer according to claim 3, wherein first, second, and third partial windings are divided in the ratio of 1:3:6 or 1:3:9.

5. The tap changer according to claim 1, wherein the semiconductor switches each comprise a nonparallel connected thyristor pair or an anti-serially connected insulated-gate bipolar transistor pair.

6. The tap changer according to claim 1, wherein at least one of the semiconductor switches comprises a series connection or a parallel connection of at least two individual semiconductor switches.

* * * * *